United States Patent [19]

Breen

[11] Patent Number: 4,906,297

[45] Date of Patent: Mar. 6, 1990

[54] SILICATE-BONDED SILICA MATERIALS

[76] Inventor: Thomas E. Breen, 143 Macquarie Street, Sydney, N.S.W., Australia

[21] Appl. No.: 2,666

[22] PCT Filed: Mar. 12, 1986

[86] PCT No.: PCT/AU86/00063

§ 371 Date: Nov. 12, 1986

§ 102(e) Date: Nov. 12, 1986

[87] PCT Pub. No.: WO86/05478

PCT Pub. Date: Sep. 25, 1986

[30] Foreign Application Priority Data

Mar. 12, 1985 [AU] Australia .............................. PG9655

[51] Int. Cl.$^4$ .............................................. C09D 1/02
[52] U.S. Cl. ...................................... 106/84; 106/74; 106/287.14
[58] Field of Search ...................... 106/74, 84, 287.14

[56] References Cited

U.S. PATENT DOCUMENTS

| 82,202 | 9/1868 | Boyle | 106/74 |
|---|---|---|---|
| 1,587,057 | 6/1926 | Winship | 106/85 |
| 2,662,022 | 12/1953 | Dietz | 106/84 |
| 2,883,723 | 4/1959 | Moore et al. | 106/74 |
| 3,024,125 | 3/1962 | Lee | 106/287.1 |
| 3,523,085 | 8/1970 | Shannon | 252/62 |
| 3,642,503 | 2/1972 | Beaney | 106/38.35 |
| 3,970,462 | 7/1976 | Stillman | 106/38.3 |
| 4,162,169 | 7/1979 | Schutt | 106/84 |
| 4,174,224 | 11/1979 | Seki et al. | 106/84 |
| 4,199,365 | 4/1980 | Randall | 106/84 |
| 4,213,785 | 7/1980 | Blanc et al. | 106/84 |
| 4,288,253 | 9/1981 | Venable | 106/84 |
| 4,396,431 | 8/1983 | Seeney et al. | 106/74 |

FOREIGN PATENT DOCUMENTS

| 108685 | 4/1940 | Australia . | |
|---|---|---|---|
| 155386 | 2/1954 | Australia . | |
| 159273 | 10/1954 | Australia . | |
| 442653 | 11/1973 | Australia . | |
| 466390 | 10/1975 | Australia . | |
| 513035 | 11/1980 | Australia . | |
| 2060155 | 6/1971 | Fed. Rep. of Germany | 106/84 |
| 5089411 | 7/1975 | Japan | 106/84 |
| 256258 | 3/1927 | United Kingdom . | |
| 1514674 | 6/1978 | United Kingdom . | |

Primary Examiner—Mark L. Bell
Assistant Examiner—Karl Group
Attorney, Agent, or Firm—Alexis Barron

[57] ABSTRACT

A cementitious composition is produced from a curable mixture of particulate or comminuted silica, an alkali metal silicate, and an alkyl silicate. The preferred composition includes 80 to 95 weight percent silica, 5 to 20 weight percent sodium or potassium silicate, 5 to 15 weight percent, based on the total weight of silica and sodium or potassium silicate, of ethyl silcate and optionally an ester catalyst which is an ester of a long chain organic carboxylic acid.

15 Claims, No Drawings

SILICATE-BONDED SILICA MATERIALS

TECHNICAL FIELD

This invention relates to silicate-bonded silica materials, and more particularly to structural and masonry units and building components produced from such materials including wall, floor, roof and ceiling tiles, paving materials and special plastering (in situ and masonry unit application) compounds.

BACKGROUND ART

"Artificial" and "reconstituted" stone has long been made by man, many buildings dating from the Imperial Rome epoch being mainly constructed of a kind of concrete which was faced with marble. However, in this latter half of the twentieth century, concrete has proved to be less attractive as a building material because of the high atmospheric pollution obtaining in today's towns and cities, which conditions can destroy concrete, and even such natural materials as marble and sandstone, in the course of time.

DISCLOSURE OF THE INVENTION

It is thus an object of the present invention to overcome the above and other disadvantages of conventional building materials by the provision of "artificial stone" which is extremely resistant to acidic and other atmospheric pollutants, and which has the physical strength and other mechanical characteristics to enable it to be used in building construction.

It is a further object of the present invention to utilise, for the above purpose, one of the Earth's most abundant elements, that is to say, silicon, to produce silicate-bonded silica materials.

According to one aspect of the present invention there is provided a moldable composition comprising a particulate material, including sand, an alkali metal silicate, and optionally an alkyl silicate and/or an ester catalyst or other precipitant. The invention also provides articles of manufacture molded from such compositions and to a process for producing molded articles.

The sand may be any suitable readily available silica sand or mixtures of sand. A preferred silica sand is a pure white silica sand, very large deposits of which have been ascertained to exist, particularly in Australia. One such deposit which has been identified is of very high purity, having a $Fe_2O_3$ content of less than 0.008%; the virtually iron-free nature of this raw material being of great natural advantage in avoidance of discolouration, streaking, etc, due to weathering; and producing pristine white units, or combined with additives e.g. pigments, to give subtle shading effects. However, other sands of various colours can also be employed to give different shades of colour or different surface effects to the final moulded product.

In some embodiment of the invention, a predetermined percentage of silica sand is firstly ground to a smaller particle size (e.g. 100-300 mesh), and in some cases finely comminuted silica "flour" is employed in the sand mix. Usually, no more than about 5-20% by weight of the fine sand is used in the sand mix. This flour tends to prevent any voids or occlusions occurring in the finished blocks, and may also reduce the quantity of binder required in the manufacturing process. It has been found that when no fine sand is included in the sand mix the surface of the moulded produce has a rough texture. However, incorporation of even 10% finer silica material is sufficient to substantially eliminate most of this surface roughness. Using an alkyl silicate and an alkali metal silicate also gives quite a smooth surface texture.

The alkali metal silicate is normally selected from sodium silicate or potassium silicate, preferably the latter (preferred $SiO_2:K_2O$ ratio in the range of 1.7:1 to 1.4:1). In some cases, it may be of advantage to use mixtures of sodium silicate and potassium silicate.

Sodium silicate has for many years been extensively used in the field of metal-founding as a binder. Spray-on protective coatings have also been proposed, composed of curable silicate compositions containing a phosphate hardener coated with a reaction product of a metal aluminate and/or metal borate.

It is envisaged, however, that a sodium silicate binder may lack the necessary strength characteristics, particularly for the manufacture of pre-cast units, and in consequence potassium silicate binders are highly preferred.

Various proposals for the production of potassium silicate binders and "weatherproof" protective coatings have been made; for instance Weiand et al have worked on cold hardening refractory binders prepared from alkali metal (with particular reference to potassium) silicate with various solutions. Weather resistant coatings prepared by employing potassium water glass have been proposed by Strobonov et al, modified potassium silicate binder in potassium aluminosilicate-bonded material by Korneev et al, while optimal values for the potassium/silica ratio of potassium silicate protective coatings have been investigated by Perlin et al, and potassium silicate solutions by Murashkevick.

Used alone, the alkali metal silica is normally employed in amounts up to 20-25% by weight of the moldable composition, but usually requires thermal curing at temperatures of up to about 200° C. for several hours. The quantity of alkali metal silicate can be substantially reduced to about 10% in the presence of ester catalysts and to about 5% in the presence of ethyl silicate. Ideally, the amount of alkali metal silicates are kept to a minimum in the moldable mix to prevent staining caused by alkali leaching.

The alkali metal silicate can be added to the moldable composition or can be formed in situ by mixing the sand with an alkali, such as sodium or potassium hydroxide, whereby an alkali metal silicate is precipitated and apparently functions as a binder for the particulate silica sand, and is allowed to cure at ambient temperature. Thermal curing up to 200° C. tends to strengthen the product and to reduce the amount of free alkali present, presumably due to reaction with the silica present.

The alkyl silicate is preferably ethyl silicate, and is usually used in amounts of about 5-15% by weight of the moldable composition (e.g. 5-10% potassium silicate and 5-15% ethyl silicate). The addition of ethyl silicate appears to provide added strength to the product when compared with potassium silicate alone.

Thermal curing at temperatures of up to 200° C. for several hours increases the strength.

The ester catalysts are generally esters of long chain organic carboxylic acids, and usually esters of unsaturated aliphatic carboxylic acids. Ester catalysts conventionally used in foundry sand molding may also be used in this invention. Examples of typical ester catalysts are those sold under the names 'Veloset' and 'Abel Lemmon Catalyst'. The ester catalyst is usually used in amounts of about 5-15% by weight of the moldable composition (e.g. 10–20% potassium silicate and 5–15% ester catalyst). The addition of ester catalyst appears to provide added strength to the product when compared with potassium silicate alone.

Although a "catalyst" does not normally appear in the final reaction product, in the present invention the "catalyst" is incorporated into the final product.

Catalysts shown a rather marked specificity of action. There is no universal catalyst, so that, in the case of any given reaction, there is generally one specific catalyst, or at most a small number of catalysts, which are specially effective; and in the practical applications of catalysis, such as in industrial operations, the search for the most efficient catalyst for a particular reaction becomes a matter of routine practice.

Other compounds may be included in the moldable composition as required e.g. additional binders, plasticizers and fillers. As fillers there are used the usual inert substances, which may be incorporated for special purposes such as colour or because it is a readily available local material, e.g. bauxite, lime, kaolin and other clays.

While the abovegoing description has been couched in terms of the production of an "artificial" siliceous stone, another aspect of the invention relates to glass-like materials. While glasses were long regarded as being merely greatly supercooled liquids of high viscosity, in which the molecules had a chaotic and random distribution, more recent investigation suggests that this traditional view must now be modified. In silica glass for example, there may be a building-up of a silicon-oxygen network or lattice in much the same way as crystalline silica, although some truly amorphous material may also be present.

Many workers in the field of glass have used potassium silicate as a binder in the manufacture of the frit for the making of such material as optical glass, notably by Sumitomo Electric Industries Ltd, and of thermally insulating coatings, by Ballard (Rolls Royce Ltd). It is envisaged that, also according to the present invention, crystalline potassium silicate may be cross-linked with selected unsaturated organic compounds to produce what, in effect, is a "cold-setting" glass.

In a further variation, ethyl silicate might be incorporated into a product to provide a range of elastomeric materials.

Whilst no detailed work has been carried out on possible reaction mechanisms, it would seem reasonable to propose two kinds of reaction which may be occurring. Firstly, it would appear that the alkali in the alkali silicate is reacting with the silica surface on the sand grains forming a silicate bond. One would expect that such a bond would be liable to solubility in water (as has been found to be the case with no extra catalysts used) and that the bond strength would increase with curing temperature due to a greater extent of reaction—again such an effect has been observed.

The other likely reaction mechanism is a precipitation of a fine silica network from the alkali silicate when either ester catalysts or ethyl silicate is used. Such a precipitation would be enhanced with ethyl silicate which would itself precipitate silica because of an hydrolysis reaction occuring. It is noted that when ester catalysts or ethyl silicate is used, there is a distinct setting of compacts after about 15–20 minutes of pressing, which is not the case when these reactions are not used. Such a fact supports the concept of precipitation of a fine silica network. The bond therefore would be formed both by silicate bonding as described above and also by an interlocking network of fine silica filling the voids between grains of sand.

MODE FOR CARRYING OUT THE INVENTION

According to the present invention the components of the moldable composition are admixed together to form an homogenous mixture, with water added to the degree necessary to assist moldability to the desired shape.

If desired, the moulded shape may be cured entirely at ambient temperatures, since elevated temperature curing is not required to provide a product with excellent mechanical properties. However, thermal curing at temperatures of up to 200° C. for several hours may increase the strength of the product and reduce the possibility of water slumping or the leaching of alkali from the final product.

The moldable compositions of the present invention can be molded into a variety of shapes, including blocks, panels, sheets, tiles and the like. The final product is densely compacted and non-porous, and resistant to acid and alkali corrosion (e.g. from "acid rain"). Suitable pigments can be added during the manufacture to produce a range of coloured finishes. The surfaces of the product may be glazed or given any desired surface finish treatment.

Although conventional mortars may be employed in the laying of blocks manufactured according to the invention, suitable mortars and the like may also be produced from the moldable mixtures of the present invention, with or without plasticizers or other additives.

It will be seen that a particular advantage of the invention lies in the fact that the materials can be cured at ambient temperature just as are the much-inferior concretes. Thus, masonry blocks, panels, tiles, etc., can be pre-cast cheaply and easily and then transported to a building site; on the other hand, large slabs, structural units and the like may just as cheaply and rapidly be produced in situ (with or without reinforcing).

Molded products were prepared from a moldable composition prepared by weighing out the necessary quantities of material, mixing them, and molding the resultant composition to the desired shape and curing the molded shape at either ambient or elevated temperature. The final products presented a good finish and a pleasing appearance and had good strength (15–40 MPa compressive strength), and were stable to rain, sunlight and general weathering conditions. Resistance to water slumping was tested by placing the molded product in boiling water for at least four (4) hours. Resistance to acid corrosion was tested by placing the molded product in concentrated (4M) hydrochloric acid for at least several hours.

The following non-limiting examples are intended to illustrate the invention.

EXAMPLE 1

A mixture was prepared comprising 80% by weight of 100 mesh silica sand and 20% by weight of K60 potassium silicate ($SiO_2:K_2 = 1.4:1$), together with 15% by weight (based on the total weight) of Veloset 33 ester catalyst (Foseco). This mixture was mixed thoroughly for five (5) minutes, a small quantity of water was added to assist moldability, and then the mixture was pressed into metal dies to give samples of 10 cm diameter and 12 cm height. The samples were allowed to cure at room temperature for twenty four (24) hours.

The cured samples had good strength and were resistant to hot water slumping and to attack by 4M hydrochloric acid.

Similar results were obtained using sodium silicate instead of potassium silicate.

EXAMPLE 2

A mixture was prepared comprising 90% by weight silica (80% sand, 10%-100 mesh silica, 10%-300 mesh silica) 10% K60 potassium silicate and 5% Veloset ester catalyst (based on total weight) with sufficient added water to assist moldability. The mixture was pressed into suitable molds and cured at room temperature for twenty four (24) hours. The cured samples had good strength and were resistant to hot water slumping and to acid attack.

EXAMPLE 3

The same mixture as in Example 2 was pressed into molds and cured at 150° C. for six (6) hours. The cured samples exhibited greater strength than similar samples cured at room temperature, and they were unaffected by hot water or concentrated acid.

EXAMPLE 4

85% silica (80% sand, 10%-100 mesh silica, 10%-300 mesh silica) 15% K60 potassium silicate.

The mixture was cured at 200° C. for six (6) hours. The products were not affected by hot water or 4M hydrochloric acid.

EXAMPLE 5

90% silica (80% sand, 10%-100 mesh silica, 10%-300 mesh silica), 10% K60 potassium silicate, 7.5% ethyl silicate (based on total weight).

The mixture was cured at room temperature for twenty four (24) hours. The cured samples exhibited good strength and were not affected by hot water or 4M hydrochloric acid.

EXAMPLE 6

Example 5 was repeated, except that samples were cured at 100° C. and 200° C. The products exhibited an increase both in hardness and in strength.

EXAMPLE 7

95% silica (80% sand, 10%-100 mesh silica, 10%-300 mesh silica), 5% K60 potassium silicate, 7.5% ethyl silicate (based on total weight).

The mixture was cured at room temperature for twenty four (24) hours. The cured samples exhibited good strength and were not affected by hot water or 4M hydrochloric acid.

Although the invention has been described above with reference to examples and to preferred embodiments, it will be appreciated that the invention may be embodied in other forms or carried out in other ways without departing from the spirit or essential characteristics thereof. The above description is therefore to be considered in all respects, illustrative and not restrictive, and all changes which come within the meaning and range of equivalency are intended to be embraced therein.

I claim:

1. A curable composition for the manufacture of building blocks, structural units and preformed concrete-like materials suitable for internal or external use, said composition comprising 80 to 95% by weight silica and about 5 to 20% by weight of sodium or potassium silicate, and including also ethyl silicate present in proportion of about 5 to 15% by weight of the total weight of silica and sodium or potassium silicate.

2. A composition according to claim 1 including also an ester catalyst which is an ester of a long chain organic carboxylic acid.

3. A composition according to claim 2 wherein said ester catalyst is present in proportion of about 5 to 15% by weight of the total weight of silica and sodium or potassium silicate.

4. A composition according to claim 2 wherein said ester is that of an unsaturated aliphatic carboxylic acid.

5. A composition according to claim 4 wherein said ethyl silicate and said ester are, in combination, present in proportion of 5 to 15% by weight of the total weight of silica and sodium or potassium silicate.

6. A composition according to claim 1, 2, 3, 4, or 5 wherein said silica comprises a mixture of silicas, about 5 to 20% by weight of the mixture being comminuted silica flour.

7. A cured building material suitable for internal or external use formed from a molded curable composition which has been cured at an elevated temperature of no greater than about 200° C., the curable composition comprising 80 to 95% by weight silica, about 5 to 20% by weight of sodium or potassium silicate, and ethyl silicate present in proportion of about 5 to 15% by weight of the total weight of silica and sodium or potassium silicate.

8. A building material according to claim 7 wherein said composition includes also an ester catalyst which is an ester of a long chain organic carboxylic acid.

9. A building material according to claim 8 wherein said ethyl silicate and said ester are, in combination, present in proportion of 5 to 15% by weight of the total weight of silica and sodium or potassium silicate.

10. A building material according to claim 7, 8 or 9 wherein said silica comprises a mixture of silicas, about 5 to 20% by weight of the mixture being silica flour.

11. A material according to claim 7 wherein said composition is cured at a temperature of about 200° C.

12. A material according to claim 10 wherein said composition is cured at a temperature of about 200° C.

13. A method for preparing an article suitable for use as a building block, structural unit or similar material for either internal or external use comprising the following steps:

(a) preparing a water-glass composition comprising 80 to 95% by weight silica, about 5 to 20% by weight of either sodium or potassium silicate, an ester catalyst which is an ester of a long chain organic carboxylic acid in sufficient quantity to cause setting of said composition, and ethyl silicate present in proportion of about 5 to 15% by weight of the total weight of silica and sodium or potassium silicate; and (b) forming an article from said composition in a mold and allowing said composition to set thereby producing said article, the article capable of resisting the effects of prolonged exposure to water without losing structural strength.

14. A method according to claim 13 wherein said ethyl silicate and said ester are, in combination, present in proportion of 5 to 15% by weight of the total weight of silica and sodium or potassium silicate.

15. A method according to claim 13, or 14 wherein said silica comprises a mixture of silicas, about 5 to 20% by weight of the mixture being comminuted silica flour.

* * * * *